United States Patent
Vatansever et al.

(10) Patent No.: US 12,472,204 B2
(45) Date of Patent: Nov. 18, 2025

(54) COMPOUND OF ELEMENT ACID, WHICH IS IN ALLOTROPIC FORM, WHICH ENTERS INTO CELLULAR INTERACTION IN SOME BONE DISEASES

(71) Applicant: CELAL BAYAR UNIVERSITESI DIGER MERKEZLER MUDURLUGU, Manisa (TR)

(72) Inventors: Hafize Seda Vatansever, Manisa (TR); Fatih Ozcan, Manisa (TR); Ceyda Ozcan, Manisa (TR)

(73) Assignee: CELAL BAYAR UNIVERSITESI DIGER MERKEZLER MUDURLUGU, Manisa (TR)

( * ) Notice: Subject to any disclaimer, the term of this patent is extended or adjusted under 35 U.S.C. 154(b) by 319 days.

(21) Appl. No.: 18/269,291

(22) PCT Filed: Apr. 5, 2021

(86) PCT No.: PCT/TR2021/050309
§ 371 (c)(1),
(2) Date: Jun. 23, 2023

(87) PCT Pub. No.: WO2022/146277
PCT Pub. Date: Jul. 7, 2022

(65) Prior Publication Data
US 2024/0082298 A1    Mar. 14, 2024

(30) Foreign Application Priority Data
Dec. 30, 2020   (TR) .................................. 2020/22570

(51) Int. Cl.
*A61K 33/22*      (2006.01)
*A61P 19/08*      (2006.01)
*C12N 5/077*      (2010.01)

(52) U.S. Cl.
CPC .............. *A61K 33/22* (2013.01); *A61P 19/08* (2018.01); *C12N 5/0654* (2013.01)

(58) Field of Classification Search
CPC ......... A61K 33/22; A61K 31/69; A61P 19/08; C12N 5/0654; C07F 5/022
See application file for complete search history.

(56) References Cited

U.S. PATENT DOCUMENTS

2008/0260862 A1    10/2008    Gorsek

OTHER PUBLICATIONS

Toker et al.; "The effect of boron on alveolar bone loss in osteoporotic rats"; Journal of Dental Sciences (2016) 11, pp. 331-337. Published online.*
Karin A. Schwartz, et al., p53 Transactivity During In Vitro Osteoblast Differentiation in a Rat Osteosarcoma Cell Line, Molecular Carcinogenesis, 1999, pp. 132-138, vol. 25.
Dimitra Micha, et al., An in vitro model to evaluate the properties of matrices produced by fibroblasts from osteogenesis imperfecta and Ehlers-Danlos Syndrome patients, Biochemical and Biophysical Research Communications, 2020, pp. 310-317, vol. 521, No. 2.

* cited by examiner

*Primary Examiner* — Jeffrey T. Palenik
(74) *Attorney, Agent, or Firm* — Bayramoglu Law Offices LLC

(57) ABSTRACT

The present invention provides usage of boric acid in a method of brittle bone disease treatment. In the present invention, moreover, there is a new brittle bone disease (osteogenesis imperfecta) in-vitro model for observing the effect of boric acid on brittle bone disease.

4 Claims, 1 Drawing Sheet

COMPOUND OF ELEMENT ACID, WHICH IS IN ALLOTROPIC FORM, WHICH ENTERS INTO CELLULAR INTERACTION IN SOME BONE DISEASES

CROSS REFERENCE TO RELATED APPLICATIONS

This application is the national phase entry of International Application No. PCT/TR2021/050309, filed on Apr. 5, 2021, which is based upon and claims priority to Turkish Patent Application No. 2020/22570, filed on Dec. 30, 2020, the entire contents of which are incorporated herein by reference.

TECHNICAL FIELD

The present invention relates to usage of boric acid in brittle bone disease treatment. In the invention, moreover, there is a brittle bone disease in-vitro model used for observing the effect of boric acid on the disease.

BACKGROUND

Boron is an element shown by symbol B in periodic table and which has semiconductor characteristic between metal and non-metal. Boron element is formed by 8B, 10B, 11B, 12B and 13B isotopes. The most stable isotopes are 10B and 11B. 10B isotope has very high thermal neuron retention characteristic. Thus, it can be used in nuclear materials and nuclear power plants.

The chemical characteristics of boron element depend on the morphology and particle size. While micron sized amorphous boron enters into reaction easily and sometimes in an intense manner, crystalline boron does not easily enter into reaction. Boron reacts with water at high temperature and it forms boric acid and some other products. The reaction of boron with mineral acids can be slow or explosive depending on concentration and temperature and boric acid occurs as the main product.

Boron stabilizes cell membrane and regulates carrier mechanisms in the membrane. It has anti-inflammatory, anti-neoplastic and hypo-lipidemic effects. Moreover, it stimulates bone growth and bone metabolism. Boron activates 1,25(OH)D3 production and thus, it increases bone mineralization. Sufficient amount of boron intake is useful for trabecular bone micro-structure and cortical bone resistance. In the studies made in the literature, it has been observed that in case of boron insufficiency, the induced changes in the bone structure affect bone strength and increase osteoporosis risk, and moreover, intake of boric acid decreases bone loss.

Although there are studies made in relation to boron and boric acid as mentioned above, there is no study, which is related to the usage of boric acid in the treatment of brittle bone disease, in the known state of the art. The brittle bone disease is a disease where blue sclera, tooth disorders and hearing disorders can occur besides easy and frequent breaks in bones. It occurs due to structural disorder of type 1 collagen which exists in bone structure. As brittle bone disease shows genetic transition, disease can occur in the baby as a result of mutations which occur in the mother's uterus although the genetic structure of the mother and father is normal. In genetic transition, if one of the parents suffers from this disease, the disease occurrence risk in the child is 50%. Besides, in the case called mosaicism, this disease exists in some of the genes of the mother and father, but the mother and the father are healthy. If these diseased genes transit to the child, this may lead to the disease. For the parents who suffer from mosaicism, the risk of having diseased child is between 2% and 7%.

Brittle bone disease can be clinically diagnosed. Moreover, diagnosis of the disease can be realized by means of skin biopsy, genetic test in the blood and amniocentesis at the $14^{th}$-$18^{th}$ weeks of the intrauterine. There are primarily four types. Type 2 brittle bone diseased children die in early period after birth. Again in these types, besides the types where the sclera is white or blue, there are types of brittle bone diseases with or without tooth disorder and with hearing disorder. The brittle bone disease type 1 gives symptom in the childhood period in the form of disorder in the collagen structure. Mostly the first symptom is in the form of repeating breaks, blue sclera and tooth disorders. In type 4 form, the disease is mild, and repeating breaks are not observed in some patients.

In brittle bone disease, when bone break occurs, the bone breaks must be treated and the deformities observed in delayed events must be corrected. In the recent years, successful results have been observed by applying biphosphonates, used in osteoporosis, to the brittle bone diseased children at specific doses and intervals for decreasing bone breaking frequency. Besides, studies continue in the area of gene treatment and treatment with growth hormone. However, all these studies are limited in reaching an effective treatment. One of the reasons of this is that model development for the brittle bone disease is insufficient. Since the studies in the area of brittle bone disease have to be made on humans, problems occur which result from ethical problems and which result from inclusion of the patients to the study. Because of all these problems, the suitable conditions for understanding the disease and the development of new treatment options are very limited.

In order to bring a solution to the abovementioned problems, while the studies related to the treatment of brittle bone disease continues in the known state of the art, the need for new compounds, agents, treatment methods and experimental in-vitro models is already continuing. The object of the present invention is to provide usage of boric acid in the treatment of brittle bone disease. In the invention, moreover, a new brittle bone disease (osteogenesis imperfecta) in-vitro model is presented for observing the effect of boric acid on the disease.

BRIEF DESCRIPTION OF THE INVENTION

The main object of the present invention is to provide the compound of Formula 1 for use in the treatment of brittle bone disease.

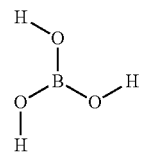

Formula 1

An embodiment of the present invention relates to the compound of formula 1 for use as an agent for the treatment of brittle bone disease.

An embodiment of the present invention provides an in-vitro model for observing the effect of boric acid compound on brittle bone disease.

In accordance with the other embodiment of the present invention, said in-vitro model comprises differentiated osteoblast cells.

In another embodiment of the present invention, osteoblast cells have been differentiated by means of hydroxy-urea.

In an embodiment of the present invention, a method, comprising the following steps, is presented for the formation of in-vitro model of the present invention.
c. Adding hydroxy-urea between 1 mM and 10 mM to the culture medium,
d. Treating with osteoblast cells for duration over 24 hours.

In the other embodiment of the present invention, the usage of boric acid for treatment of osteoporosis or a degenerative bone disease is described.

DETAILED DESCRIPTION OF THE INVENTION

Figure 1A:
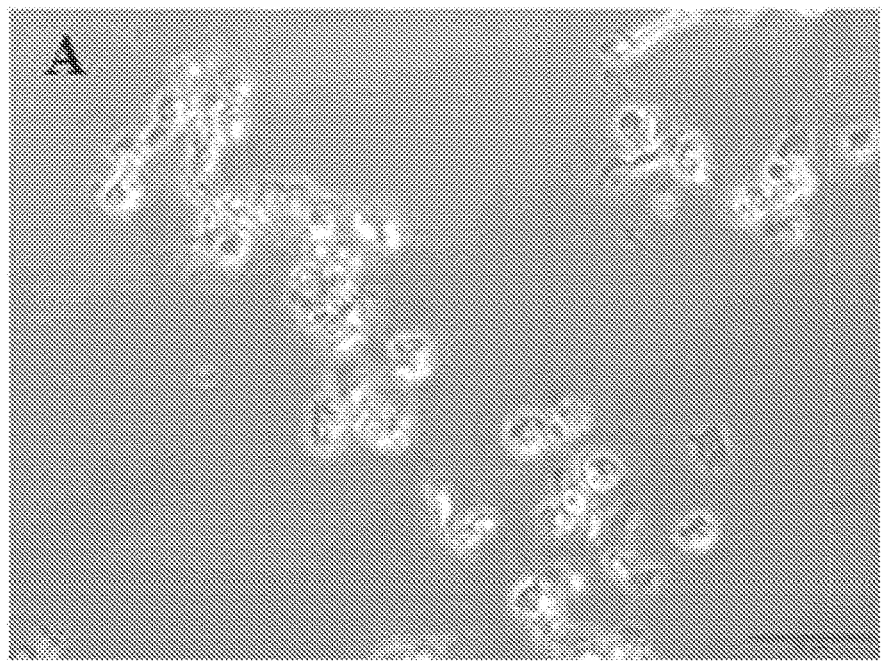
In FIG. 1A, the image of osteoblast cells which are differentiated from the foreskin (prepuce) mesenchymal root cells is given. It is the image of osteoblast cells of 24 hours after application of hydroxy-urea. (Scale: 100 μm)

The main embodiment of the present invention relates to the compound of Formula 1 for use in the treatment of brittle bone disease. The present invention moreover relates to the compound of Formula 1 for use as an agent for the treatment of brittle bone disease.

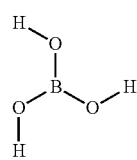

Formula 1

Boric acid, which exists in Formula 1 of the present invention, is obtained by means of reaction of boron with water or mineral acids. The chemical formula thereof is $H_3BO_3$ or $BH_3O_3$ or $B(OH)_3$.

An embodiment of the present invention presents an in-vitro model for observing the effect of boric acid on brittle bone disease. The studies made on brittle bone disease are realized on in-vivo models. Experimental brittle bone disease models are in-vivo models obtained by using embryonic root cells of transgenic or genetic engineering formed by changing COL1A1 gene. The production of these models is difficult and various problems like survival of the mice are faced. The production costs thereof are substantially high. An embodiment of the present invention presents an in-vitro model which overcomes these problems and which allows studies at the cellular level before passing to the experimental in-vivo models.

In the other embodiment of the present invention, said in-vitro model comprises differentiated osteoblast cells. Even though the formation mechanisms of the brittle bone disease (osteogenesis imperfecta) have not been completely clarified, the changes in DNA damages are similar to cellular ageing. Therefore, the cellular ageing model has been considered to be suitable for the in-vitro model of the brittle bone disease. Cellular ageing is a cellular response where growth stops and where other cellular changes occur. Cellular ageing is also observed in normal and pathologic conditions for providing tissue hemostasis and for delimiting tumor advance. In the present invention, said cellular ageing model has been reached by means of differentiation of osteoblast cells in an in-vitro manner. Thanks to this, the ageing model has been obtained in the in-vitro conditions without any change in the telomere length. The change made in osteoblast DNA as a result of differentiation and the changes existing in the cells subjected to brittle bone disease are similar. Thanks to the examinations made on similar cell type, the symptoms, which belong to the disease, have been reached in shorter durations and more easily. In the present invention, particularly by means of applying boric acid to said in-vitro model, favorable effects have been observed in the augmentation of osteoblasts and in the protection of these cells from ageing.

In another embodiment, the osteoblast cells of the present invention are osteoblast cells which have been differentiated by means of hydroxy-urea in the in-vitro medium. Hydroxy-urea is ribo-nucleotide reductase enzyme inhibitor, and the nitric oxide, which occurs as a result of peroxidation thereof, decreases the nucleic acids which are needed for DNA synthesis and as a result, it forms DNA break. Hydroxy-urea has been used for obtaining the differentiated osteoblast cells which exist in the present invention. Thus, an in-vitro model has been easily obtained with low cost, which comprises differentiated osteoblast cells which allow studies at the cellular level before passing to experimental in-vivo models.

In accordance with another embodiment, a method, comprising the following steps, is presented for the formation of in-vitro model of the present invention.
c. Adding hydroxy-urea between 1 mM and 10 mM to the culture medium,
d. Treating with osteoblast cells for duration over 24 hours.

The other embodiment of the present invention relates to the usage of said boric acid in the treatment of osteoporosis and other degenerative diseases which are related to bones.

Example—1

Formation of Experimental Model by Means of Hydroxy-Urea

In order to differentiate osteoblast for obtaining the ageing model, 1 mM hydroxy-urea (Sigma, H8627-1G, Kaufkirchen, Germany) has been added to the culture medium and is treated with osteoblast cells for 24 hours.

Study Groups and Boric Acid Application

Osteoblast cells have been separated to 4 groups and the $1^{st}$ group has been cultured in the normal osteoblast culture medium as the control group. The $2^{nd}$ group has been determined as the boric acid group by adding 0.1 mM boric acid into the osteoblast culture medium. The $3^{rd}$ group is the ageing group and has been cultured with 1 mM hydroxy-urea to the osteoblast culture medium and has been determined as the experimental brittle bone disease group. The $4^{th}$ group has been determined as the group where boric acid is applied to the osteogenesis imperfecta model by applying 1 mM boric acid to the cells where ageing model has been formed. Boric acid has been applied to $2^{nd}$ and $4^{th}$ groups for 72 hours and group 1 and group 3 have been cultured in their own culture media at the same durations.

TABLE 1

The study groups prepared for observing the
effect of boric acid on brittle bone disease

| 1st group | Control group | Osteoblast |
| 2nd group | Boric acid group | Osteoblast + 0.1 mM boric acid (72 hours) |
| 3rd group | Ageing group | Osteoblast + 1 mM hydroxy-urea |
| 4th group | Experimental brittle bone disease group | Osteoblast + 1 mM hydroxy-urea + 0.1 mM boric acid (72 hours) |

Figure 1B:
In FIG. 1B, the image of the cells after application of boric acid is given. (Scale: 50 μm)

As a result of the study existing in the example, it has been observed that after boric acid is applied (4th group) to osteoblast cells (FIG. 1A) where hydroxy-urea is applied, they preserve their epithelioid structures, and intercellular vacuoles decrease, and cytoplasmic vacuoles begin to occur (FIG. 1B). The figures of the present invention have been obtained from cell culture and by means of inverted microscope (Olympus IX71).

When the immuno-reactivity of osteonectin and osteocalcin released by osteoblasts is evaluated, it has been detected that cellular morphology has improved after applying boric acid, and moreover, the immuno-reactivity of both proteins increases, and the immuno-reactivity of normal osteoblast cells is as expected. It has been concluded that since the immuno-reactivity of Ki-67 used as proliferation marker in cells is greater in osteoblasts where boric acid is applied, boric acid triggers proliferation in cells where ageing model is formed by hydroxy-urea.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. An in-vitro model, comprising:
   a culture medium, and
   a compound having Formula 1, wherein Formula 1 is:

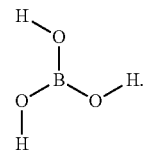

2. The in-vitro model according to claim 1, further comprising differentiated osteoblast cells.

3. The in-vitro model according to claim 2, wherein the osteoblast cells are differentiated by means of hydroxy-urea added to the in-vitro model.

4. A method for the formation of an in-vitro model comprising the following steps:
   adding hydroxy-urea between 1 mM and 10 mM to a culture medium comprising the compound of Formula 1, wherein Formula 1 is:

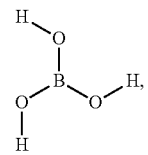

and
   treating with osteoblast cells for duration over 24 hours.

* * * * *